3,153,006
FLUIDIZABLE CATALYSTS CONTAINING MONO-ORGANOSILOXANE UNITS AND OXY-CONTAINING UNITS DERIVED FROM ALUMINUM, BORON, AND TIN
Francis G. A. De Monterey, Troy, N.Y., assignor to General Electric Company, a corporation of New York
No Drawing. Filed Aug. 29, 1960, Ser. No. 52,368
6 Claims. (Cl. 260—46.5)

The present invention relates to novel fluidizable copolymers containing monoorganosiloxane units, and oxy-containing units derived from certain metals and nonmetals. This invention also relates to the process for making such copolymeric compositions.

The novel compositions of the present invention hereinafter referred to sometimes as "copolymers" are represented by the formula:

(1) $(RSiO_{1.5})_x(M)_y$ where M is a member selected from the class of aluminoxy units, phosphoxy units, boroxy units, and stannoxy units, $x$ and $y$ are numbers whose sum is greater than 400, where the ratio of $x$ to $y$ can vary over a range of 0.8 to 9.0, inclusive, and R is a member selected from the class of monovalent hydrocarbon radicals and halogenated monovalent hydrocarbon radicals.

The novel copolymers of Formula 1 are amorphous free-flowing fluidizable powders having a particle size in the range of about 10 millimicrons to about 10 microns. These compositions are useful as fluidized catalysts or catalyst carriers and their catalytic activity for cracking hydrocarbons is comparable to the conventional silica-alumina catalyst such as described in the Journal of Physical Chemistry 61, 814 (1957). The compositions of the present invention are unlike the conventional silica-alumina catalysts since the subject copolymers have organic radicals attached to silicon through carbon-silicon linkages. These compositions are able to provide free radicals for free radical exchange reactions at hydrocarbon cracking temperatures to assist in cracking reactions. In addition, the fluidizable copolymers of the present invention are different from the various silicone coated aluminas and the like since the fluidizable copolymers have a plurality of organosiloxane units intercondensed with oxy-containing units derived from certain metals and nonmetals.

The preferred copolymers of the present invention are those containing aluminum and which have the formula:

(2) $(RSiO_{1.5})_a(AlO_{1.5})_b$ where R is as defined above and $a$ and $B$ are numbers having a sum greater than 400, where the ratio of $a$ to $b$ can vary over a range of from 1.5 to 9.0, inclusive.

The present invention is based on the discovery that novel copolymers of Formula 1 can be made by forming a uniform dispersion at a pH below 7 of (A) the inorganic hydrolyzate of a hydrolyzable inorganic material selected from the class consisting of aluminum chloride, hydrated alumina, phosphoric acid, boric acid, tin chloride and tin hydroxide in (B) an organosilicon hydrolyzate consisting essentially of monoorganosiloxane units having the formula:

(3) $RSiO_{1.5}$ and thereafter dehydrating said uniform dispersion until a fluidizable power is obtained, where R is as defined above.

Included within the definition of R is aromatic and chloroaromatic such as phenyl, chlorophenyl, tolyl, naphthyl, etc., aliphatic and chloroaliphatic such as alkyl, cycloalkyl, chloroalkyl, alkynl, alkenyl and alkynyl, particularly methyl, ethyl, propyl, etc. R can be all the same radical or can be a mixture of two or more of the aforementioned radicals and is preferably methyl.

The organosilicon hydrolyzate within the scope of Formula 3 is derived from compounds or compositions having the formulae:

(4) $RSi(Cl)_3$ (5) $RSi(OH)_c(ONa)_{3-c}$ where R is as defined in Formula 1 and $c$ is an integer equal to from 1 to 3, inclusive. Specific examples of the compounds that are shown by Formula 4 include methyltrichlorosilane and phenyltrichlorosilane. Compounds within the scope of Formula 5 include phenylsilanetriol, the monosodium salt of methylsilanetriol (sodium methylsiliconate), etc.

Hydrolyzable inorganic materials that have been found to be operable to produce the inorganic hydrolyzate are the hydrated aluminas such as alpha-alumina monohydrate, beta-alumina mono-hydrate, alumina trihydrate, alumina gel, aluminum hydroxide, etc.; phosphoric acids such as pyrophosphoric acid, orthophosphoric acid and metaphosphoric acid, also boric acid and pyroboric acid; the various stannic acids and stannous hydroxide, aluminum chloride, stannic chloride, and stannous chloride.

The inorganic hydrolyzates that are derived from the hydrolyzable inorganic materials within the scope of the present invention provide for the "M" units shown in Formula 1, which include for example, aluminoxy $(AlO_{1.5})$, phosphoxy $(POO_{1.5})$, boroxy $(BO_{1.5})$ and stannoxy $(SnO; SnO_2)$. Some of the inorganic hydrolyzates can be derived by direct hydrolysis from the hydrolyzable inorganic materials such as certain of the hydrated aluminas, the phosphoric acids and aluminum chloride, etc. Other inorganic hydrolyzates which are less hydrolyzable in water, can be prepared by precipitation methods, such as by the acidification of an aqueous alkaline solution of the hydrolyzable inorganic materials, such as certain aluminum hydrates, boric acids, etc.

In the practice of the invention the organosilicon material within the scope of Formula 4 or Formula 5 and the hydrolyzable inorganic material are initially mixed or slurried together in the presence of water to form a mixture comprising the inorganic hydrolyzate uniformly dispersed throughout the organosilicon hydrolyzate. Uniform dispersion is necessary for uniformity of composition in the final fluidizable copolymer.

In producing the copolymers of the present invention the organosilicon hydrolyzate can be prepared by hydrolyzing a hydrolyzable organotrichlorosilane of Formula 4, which will hereinafter be referred to as the "acid method," because hydrochloric acid is formed during the hydrolysis; or the organosilicon hydrolyzate can be prepared from an alkali-metal organosiliconate (Formula 5) which will hereinafter be referred to as the "alkaline method."

Although the alkaline method can be employed in most instances, the acid method is preferred in particular situations. For example, in the production of the polyorganoaluminosiloxanes of Formula 3, the acid method is preferred when utilizing a readily hydrolyzable alumina hydrate, such as aluminum hydroxide or alumina gel. In the acid method, the aqueous organosilicon hydrolyzate, which is prepared from an organotrichlorosilane, can be slurried directly with a hydrolyzable inorganic material such as a readily hydrolyzable alumina gel or hydrolyzable alumina hydrate. In the acid method the ingredients of the slurry must be uniformly blended such as by mechanical agitation or stirring to form the inorganic hydrolyzate throughout the organosilicon hydrolyzate.

Although the acid method is sometimes preferred, the alkaline method is favored when the hydrolyzable inorganic material is not in a readily hydrolyzable form. In addition, the alkaline method eliminates the necessity of mechanically stirring or blending the ingredients as is normally required in the acid method. A uniform dispersion of the inorganic hydrolyzate in the organosilicon hydrolyzate can be obtained by the alkaline method without the employment of mechanical agitation by acidifying an aqueous alkaline solution of a water soluble mixture of the hydrolyzable inorganic material and the organosilicon hydrolyzate in accordance with well known procedures of the art. Suitable acids such as hydrochloric or acetic acid are employed to acidify the solution and to precipitate the hydrolyzates which are formed.

The pH of the mixture of the inorganic hydrolyzate and the organosilicon hydrolyzate is not critical and will largely be determined by the materials and proportions employed. As a practical matter the pH of the hydrolysis mixture will always be below 7 because the hydrolysis mixture will automatically be acidic if the acid method is employed, and it must be at least neutral to acidic if the alkaline method is employed, since acidification is employed to effect the precipitation of the mixture of the hydrolyzates.

Reactant ratios of the hydrolyzable inorganic material and the organosilicon material within the scope of Formula 4 or 5 are selected so that the ratio of the mols of each starting material is the same as the ratio of the units derived from each starting material in Formula 1. A preferred range is about 2½ to 5 mols of organosilicon material of Formula 4 or 5 per mol of hydrolyzable inorganic material.

The copolymerization of the ingredients contained in the hydrolysis mixture and the production of the fluidizable copolymers is achieved by the removal of excess water from the mixture. Removal of excess water can be effected by the application of heat or by conventional spray drying techniques. A preferred method is by spraying the hydrolysis mixture through a heated atmosphere onto a heated surface, such as the surface of a drum drier. The dehydration of the hydrolysis mixture results in inter condensation of the two hydrolyzates and the formation of oxygen linkages between silicon atoms and the atoms of the metal or non-metal (Al, P, B, or Sn) in the inorganic hydrolyzate to form the fluidizable copolymers of Formula 1.

Dehydration temperatures in the range of from 150° C. up to 300° C. and above can be utilized in the open atmosphere without impairing the qualities of the final copolymer. Under closed conditions, or in the absence of air, temperatures up to 700° C. can be employed.

The dehydration period, curing which time substantially complete intercondensation is achieved between the inorganic hydrolyzate and the organosilicon hydrolyzate to form a fluidizable copolymer, can vary widely depending on the temperature to which the uniform dispersion is exposed, whether it is spray dried, etc. Those skilled in the art can determine the optimum time in accordance with the equipment available, proportions of reactants and materials employed, etc.

The final fluidizable product can be satisfactorily employed as a catalyst carrier without further purification. It is preferred, however, if the alkaline method is employed, to wash the copolymer either prior to or after the dehydration step to rid the copolymer of undesirable alkali-metal salt contaminants. There is no necessity for further treating the copolymer which is made by the acid method as any contaminants are volatilized off during the dehydration step.

In order that those skilled in the art will be better able to practice the present invention, the following examples are given by way of illustration and not by way of limitation.

*Example 1*

A mixture of what was equivalent to 0.135 mole of aluminum hydroxide in the form of an aluminum hydroxide gel was stirred with 0.12 mol of sodium hydroxide in 30 mols of water. To the mixture there was added with stirring, 0.30 mol of ($CH_3SiO_{1.5}$) units in the form of a sodium methylsiliconate solution. After the resulting mixture was thoroughly agitated, concentrated HCl was added until a pH of about 6.5 was obtained.

The viscous slurry that was obtained was heated at 175° C. for a period of 2 hours. A fluffy, friable powder was obtained which was washed free of salt and finally dried at a temperature of 175° C. The final product was a fluidizable powder having an average particle size of 100 millimicrons and having the average formula:

$$[(CH_3SiO_{1.5})_{2.22}(AlO_{1.5})]_n$$

where $n$ has a value of at least 140.

Infrared analysis confirms the presence of intercondensed organosiloxy units and aluminoxy units in the copolymer.

*Example 2*

A slurry of 3 mols of aluminum hydroxide as a gel containing 27% solids was rapidly stirred while 3.80 mols of methyltrichlorosilane was added over a period of 60 minutes. The temperature was maintained between 35° to 45° C. After the silane was added, 30 mols of water was slowly added to the reaction mixture. After the mixture was thoroughly agitated it was filtered and dried at 120° C. for 4 hours and a fine, friable powder was obtained. This powder was fluidizable, had an average particle size of 120 millimicrons and had the average formula:

$$[(CH_3SiO_{1.5})_{4.7}(AlO_{1.5})]_n$$

where $n$ has a value greater than 85.

Infrared analysis confirmed the fact that this copolymer was composed of intercondensed organosiloxy units and aluminoxy units.

*Example 3*

The procedure of Example 2 is repeated except that instead of filtering the reaction mixture, the slurry in the form of a uniform dispersion is sprayed onto a rotating drum which is at a temperature of about 200° C. A fine, friable copolymer corresponding to the copolymer of Example 2 is formed.

*Example 4*

Acetic acid was slowly added to an aqueous alkaline solution of an equimolar mixture of sodium orthophosphate and sodium methylsiliconate having a mol ratio of water to mixture of 15 to 1. A precipitate was formed and the pH of the mixture was reduced to 6. The white precipitate was washed with water and the washed product was oven dried at 175° C. for 24 hours. This resulted in a fluidizable copolymer having an average particle size of 500 millimicrons and having the average formula:

$$[(CH_3SiO_{1.5})(POO_{1.5})]_n$$

where $n$ has a value greater than 4000.

Infrared analysis confirmed the presence of intercondensed organosiloxy units and phosphoxy units in the copolymer.

*Example 5*

An alkaline solution of an equimolar mixture of sodium stannate and sodium methylsiliconate was prepared in a 30 to 1 mol ratio of water to mixture. The sodium stannate was prepared from stannic chloride pentahydrate ($SnCl_4 \cdot 5H_2O$) by dissolving in excess NaOH. The alkaline solution was acidified to a pH of 6 with acetic acid to form a precipitate. The precipitate was washed with copious amounts of water and then dried at a temperature of about 175° C. for 2 hours. A white, friable fluidizable powder was obtained which was water repellent. This powder had an average particle size of about 1 micron and had the average formula:

$$[(CH_3SiO_{1.5})(SnO_2)]_n$$

where $n$ has a value greater than 200.

An infrared spectra taken of the above powder confirmed the fact that it was composed of intercondensed organosiloxy units and stannoxy units.

*Example 6*

There was prepared a solution of a mixture containing an equimolar amount of sodium methylsiliconate and sodium borate, where there was utilized in the solution sufficient water to provide a mol ratio of water to mixture of 25 to 1. The sodium borate was prepared by dissolving boric acid in an excess of sodium hydroxide. The solution was acidified with acetic acid to a pH of 5.7 to form a precipitate. The precipitate was washed with water and filtered three times and then dried at 175° C. for 5 hours. The final product was found to be a white, fluidizable copolymer having an average particle size of 500 millimicrons and having the average formula:

$$[(CH_3SiO_{1.5})(BO_{1.5})]_n$$

where $n$ has a value greater than 200.

Infrared analysis of the above product confirmed the presence of intercondensed organosiloxy units and intercondensed boroxy units.

In addition having organo radicals attached to silicon through carbon-silicon linkages, and an average particle size in the range of 10 millimicrons to 10 microns, all the copolymers that are illustrated in the above examples have pore diameters in the range of 80 to 500 A. and surface areas in the range of about 150 to 500 square meters per gram.

In addition to serving as valuable cracking catalysts and catalyst carriers, the copolymers of Formula 1 have also been found to be valuable as non-reinforcing fillers for silicone elastomer compositions, and as anti-caking agents, etc.

While the foregoing examples have of necessity described only a few of the very many fluidizable copolymer compositions of the present invention, it should be understood that the present invention is directed to fluidizable copolymer compositions having a ratio of monoorganosiloxane units and units derived from inorganic hydrolyzate within the entire range set forth in Formula 1.

What I claim as new and desire to secure by Letters Patent of the United States is:

1. A process which comprises (1) hydrolyzing at a pH below 7, (A) an organotrichlorosilane having the formula, $$RSi(Cl)_3$$

in the presence of (B) an inorganic material selected from the class consisting of hydrated alumina, boric acid, and tin hydroxide, where there is utilized from about 0.8 to 9 moles of (A) per mole of (B), (2) heating the product of (1) to a temperature in the range of between about 150° C. to 700° C. to form a copolymer composed of chemically combined $RSiO_{1.5}$ units and a metalloxy unit selected from the class consisting of $AlO_{1.5}$, $BO_{1.5}$, SnO and $SnO_2$, where R is a member selected from the class consisting of monovalent hydrocarbon radicals and halogenated monovalent hydrocarbon radicals.

2. A process in accordance with claim 1, where the heating of the product of hydrolysis is accomplished by spray drying.

3. Copolymers corresponding to the formula:

$$(RSiO_{1.5})_x(M)_y$$

where M is a radical consisting of oxygen and an element selected from the class consisting of aluminum, boron, and tin, $x$ and $y$ are numbers whose sum has a value greater than 400 and up to 12,000 where the ratio of $x$ to $y$ can vary over a range of 0.8 to 9.0, inclusive, and R is a member selected from the class consisting of monovalent hydrocarbon radicals and halogenated monovalent hydrocarbon radicals.

4. A copolymer in accordance with claim 3, composed of methylsiloxy units chemically combined with a unit selected from the class consisting of aluminoxy, boroxy, and stannoxy.

5. A process which comprises (1) hydrolyzing methyltrichlorosilane in the presence of hydrated alumina, where there is utilized from about 0.8 to 9 moles of said methyltrichlorosilane per mole of said hydrated alumina, (2) dehydrating the product formed in (1) at a temperature in the range between about 150° C. to 750° C. until there is formed a fluidizable powder.

6. A process for making copolymers composed of chemically combined $RSiO_{1.5}$ units and a unit selected from the class consisting of aluminoxy, boroxy, and stannoxy which comprises (1) forming an aqueous solution at a pH above 7, of about 0.8 to 9 moles of an organosilicon hydrolyzate consisting essentially of monoorganosiloxane units of the formula, $$RSiO_{1.5}$$

per mole of an inorganic material selected from the class consisting of hydrated alumina, boric acid, and tin hydroxide, (2) reducing the pH of said solution to effect the precipitation of product, and (3) dehydrating said product at a temperature in the range of between about 150° C. to 700° C., where R is a member selected from the class consisting of monovalent hydrocarbon radicals and halogenated monovalent hydrocarbon radicals.

References Cited in the file of this patent
UNITED STATES PATENTS

| | | |
|---|---|---|
| 2,405,408 | Connolly | Aug. 6, 1946 |
| 2,460,799 | Barry | Aug. 10, 1948 |
| 2,488,449 | Trautman | Nov. 15, 1949 |
| 2,504,001 | Connolly | Apr. 11, 1950 |
| 2,584,405 | West | Feb. 5, 1952 |
| 2,644,805 | Martin | July 7, 1953 |
| 2,788,280 | Rust | Apr. 9, 1957 |
| 2,830,026 | Shapiro | Apr. 8, 1958 |
| 2,851,439 | Clark | Sept. 9, 1958 |
| 2,951,860 | Plueddemann | Sept. 6, 1960 |
| 2,974,133 | Wiberg | Mar. 7, 1961 |
| 3,008,913 | Pangonis | Nov. 14, 1961 |